E. W. GOODEY.

JOINT FOR ROLLED METAL BARS.

APPLICATION FILED AUG. 5, 1914.

Reissued Aug. 22, 1916. 14,184.

WITNESSES:

Howard S. Spring

Mae Hofmann

INVENTOR

Ernest W. Goodey

BY Mo Cova, dal

ATTORNEY.

UNITED STATES PATENT OFFICE.

ERNEST W. GOODEY, OF PHILADELPHIA, PENNSYLVANIA.

JOINT FOR ROLLED METAL BARS.

14,184. Specification of Reissued Letters Patent. Reissued Aug. 22, 1916.

Original No. 1,034,440, dated August 6, 1912, Serial No. 684,909. Application for reissue filed August 5, 1914. Serial No. 855,312.

*To all whom it may concern:*

Be it known that I, ERNEST W. GOODEY, a subject of the King of England, residing at Philadelphia, in the county of Philadelphia, State of Pennsylvania, have invented a new and useful Joint for Rolled Metal Bars, of which the following is a specification.

My invention relates to improvements in joints for rolled metal bars; the object of the invention being to so construct intersecting bars of a metal frame that they may be completely interlocked and without cutting entirely through either of the members.

A further object is to provide an improved joint which enables a strong interlock between the bars of a frame at right angles to each other, and which is especially adapted for use in connection with window skylight, and other glass structural work.

With these and other objects in view, the invention consists in certain novel features of construction and combinations and arrangements of parts, as will be more fully hereinafter described and pointed out in the claims.

Figure 1:
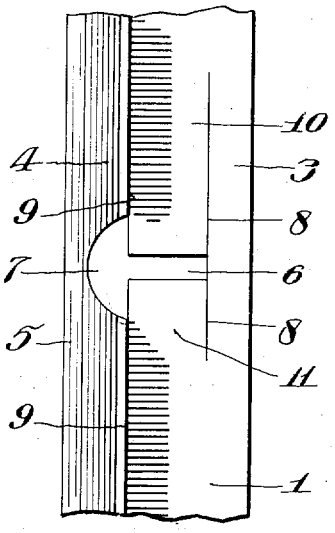
Figure 2:
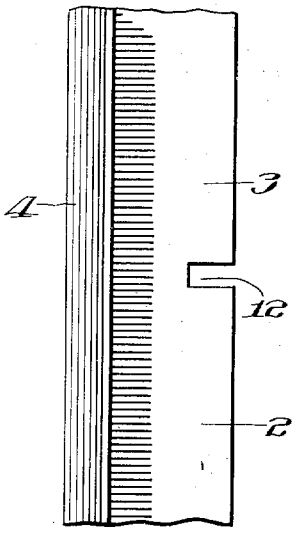
Figure 3:
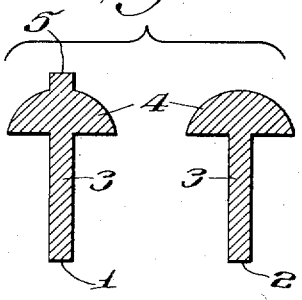
Figure 4:
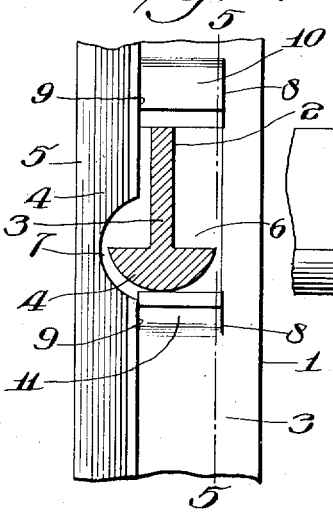
Figure 5:
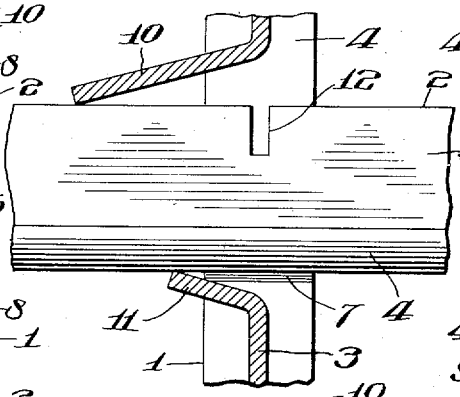
Figure 6:
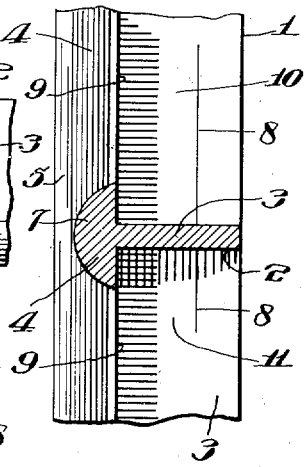
Figure 7:
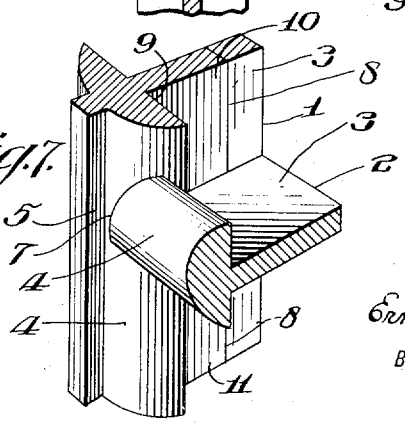

In the accompanying drawings: Figure 1 is a fragmentary view in side elevation illustrating the bar 1 of my improved joint. Fig. 2 is a similar view of the other bar 2. Fig. 3 illustrates in cross-section the bars shown in Figs. 1 and 2. Fig. 4 is a view in elevation of bar 1, showing it as it is shaped to receive the bar 2, the latter being shown in section. Fig. 5 is a view in section on the line 5—5 of Fig. 4. Fig. 6 is a view similar to Fig. 4, but showing the joint as it is completed, and Fig. 7 is a perspective view of the completed joint.

While I shall hereinafter refer to the bar 1 as the "vertical bar", and the bar 2 as the "horizontal bar", these terms are used merely for convenience of description, as they may, of course, be exactly reversed if desired.

The bars 1 and 2 each comprise web portions 3 having curved beads 4 at their forward edges. The bar 1 differs from bar 2 in that the former is provided on its outer face with a longitudinal bead 5, but in other respects the bars are alike in cross section as seen in Fig. 3.

In constructing my improved joint, the web of bar 1 is cut out transversely forming an opening 6 of substantially the same width as the thickness of the web portion 3 of bar 2. The curved bead portion 4 of bar 1 is cut out forming a curved opening 7 registering with the opening 6, and adapted to receive the rounded bead portion 4 of bar 2. The web portion 3 of bar 1 is slit longitudinally as shown at 8 and 9 forming two tongues 10 and 11 at opposite sides of the opening 6. Bar 2 is provided in its web portion at its free edge with a notch 12 which is equal in length to the distance between the openings 6 and the free edge of the web portion of the bar 1. When the bars are thus formed, the tongues 10 and 11 are bent at an angle to the web of bar 1 as shown in Figs. 4 and 5. Bar 2 is then inserted through the opening thus made, and first assumes the position shown in Figs. 4 and 5. When in this position, bar 2 is given a quarter turn to bring its rounded bead portion 4 into the curved opening 7, and its notch 12 engages the web portion of bar 1. When in this position, the tongues 10 and 11 are bent back to their normal position, and the parts will be as shown in Figs. 6 and 7. That is to say, the parts will be securely locked as they cannot move either longitudinally or laterally relative to each other, and neither of the bars will be cut entirely through.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:—

1. The combination with two bars, both bars constituting longitudinal webs and enlarged beads at one edge, one bar wider than the other and made with an opening conforming in shape to the beaded edge of the other of said bars, and having tongues adapted to be bent outwardly to receive the said last-mentioned bar, and said last-mentioned bar having a notch in its web portion to engage the web portion of the first-mentioned bar, substantially as described.

2. The combination with two bars, both bars having flat web portions and rounded beads thereon, one bar having a longitudinal bead extending beyond the rounded bead and in line with the web, said last-mentioned bar having a curved opening in its rounded bead portion, a transverse opening in its web portion extending from the rounded opening to a point removed from the edge of the web, said web having longitudinal slits forming tongues at opposite sides of the last-mentioned opening adapted to be bent to receive the other of said bars, and said last-mentioned bar having a notch in the edge of its web portion to engage the web portion of the first-mentioned bar, substantially as described.

3. In metallic sash construction, the combination of coöperating T bars having arc-shaped heads, one bar having the underside of its head provided with an arc-shaped recess corresponding to the head of the other bar, also a recess in its adjacent web for receiving the web of the other bar, and having the web adjacent thereto cut and bent out of place to receive said other T bar in a position a quarter turn out of normal position, whereby when said bar is turned to normal position the arc-shaped head will seat in the arc-shaped recess, and the bent out portions of the web when forced back into position will engage the web of said other bar.

4. In metallic sash construction, the combination of coöperating T bars having arc-shaped heads, one bar having the underside of its head provided with an arc-shaped recess corresponding to the head of the other bar, also a recess in its adjacent web for receiving the web of said other bar, and having the web adjacent thereto cut and bent out of place to receive said other T bar in a position a quarter turn out of normal position, said other bar having a notch in the margin of its web for receiving a portion of the web of the first mentioned bar, whereby when said bar is turned to normal position the arc-shaped head will seat in the arc-shaped recess, and the bent out portions of the web when forced back into position will engage the web of said other bar.

5. In metallic sash construction, the combination of coöperating T bars having arc-shaped heads, one bar having a strip or projection beyond its arc-shaped surface, and in line with the web and the underside of its head provided with an arc-shaped recess corresponding to the head of the other bar, also a recess in its adjacent web for receiving the web of the other bar, and having the web adjacent thereto cut and bent out of place to receive said other T bar in a position a quarter turn out of normal position, whereby when said bar is turned to normal position the arc-shaped head will seat in the arc-shaped recess, and the bent out portion of the web when forced back into position will engage the web of said other bar.

ERNEST W. GOODEY.

Witnesses:
MAE HOFMANN
HOWARD S. OKIE.